(12) United States Patent
Wachi et al.

(10) Patent No.: US 6,982,023 B2
(45) Date of Patent: Jan. 3, 2006

(54) ELECTROMAGNETIC WAVE SHIELDING FILTER AND ITS PRODUCTION PROCESS

(75) Inventors: Hiroshi Wachi, Ichihara (JP); Ken Moriwaki, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 73 days.

(21) Appl. No.: 10/305,194

(22) Filed: Nov. 27, 2002

(65) Prior Publication Data

US 2003/0102790 A1 Jun. 5, 2003

(30) Foreign Application Priority Data

Nov. 30, 2001 (JP) .............................. 2001-365816

(51) Int. Cl.
*B32B 31/24* (2006.01)
(52) U.S. Cl. .................................................. 156/285
(58) Field of Classification Search ................. 156/99, 156/103–106, 285–286, 295, 382; 313/112, 313/582; 445/24; 349/59, 104–111; 174/35 R; 428/432, 435; 264/604, 667
See application file for complete search history.

(56) References Cited

U.S. PATENT DOCUMENTS

| | | | |
|---|---|---|---|
| 5,834,122 A | 11/1998 | Teng et al. | |
| 6,165,546 A | 12/2000 | Teng et al. | |
| 6,229,085 B1 * | 5/2001 | Gotoh et al. | ........... 174/35 MS |
| 6,229,252 B1 | 5/2001 | Teng et al. | |
| 6,344,710 B2 | 2/2002 | Teng et al. | |
| 6,452,331 B1 | 9/2002 | Sakurada et al. | |
| 6,679,971 B2 * | 1/2004 | Tone et al. | ............... 156/306.6 |

FOREIGN PATENT DOCUMENTS

| | | | |
|---|---|---|---|
| EP | 0 851 452 A2 | | 7/1998 |
| JP | 09-247583 | | 9/1997 |
| JP | WO 97/34313 | * | 9/1997 |
| JP | 10-41682 | | 2/1998 |
| JP | 2000-286593 | * | 10/2000 |
| JP | 2000-294982 | | 10/2000 |
| JP | 2000-323889 | | 11/2000 |
| JP | 2001-77587 | | 3/2001 |
| WO | WO 99/30902 | * | 6/1999 |

OTHER PUBLICATIONS

On-line translation for JP 2000-286593.*
U.S. Appl. No. 10/023,290, filed Dec. 20, 2001, pending.
U.S. Appl. No. 10/119,839, filed Apr. 11, 2002, pending.
U.S. Appl. No. 10/187,633, filed Jul. 3, 2002, pending.
U.S. Appl. No. 10/176,604, filed Jun. 24, 2002, pending.
U.S. Appl. No. 10/176,683, filed Jun. 24, 2002, pending.
U.S. Appl. No. 10/199,105, filed Jul. 22, 2002, pending.
U.S. Appl. No. 10/222,774, filed Aug. 19, 2002, pending.
U.S. Appl. No. 10/235,487, filed Sep. 6, 2002, pending.
U.S. Appl. No. 10/251,846, filed Sep. 23, 2002, pending.

* cited by examiner

*Primary Examiner*—Jessica Rossi
(74) *Attorney, Agent, or Firm*—Oblon, Spivak, McClelland, Maier & Neustadt, P.C.

(57) ABSTRACT

A process for producing an electromagnetic wave shielding filter, which comprises bonding a substrate (A) having an electrically conductive mesh layer on one side and a functional film layer (c) at the mesh layer (a) side by means of an adhesive layer (b), wherein the laminate disposed in the order of (a)/(b)/(c) is subjected to a fluid pressure treatment.

7 Claims, 1 Drawing Sheet

Image display device side

Image display device side

Image display device side

ELECTROMAGNETIC WAVE SHIELDING FILTER AND ITS PRODUCTION PROCESS

The present invention relates to an electromagnetic wave shielding filter and its production process.

Heretofore, a filter has been installed on the front of an image display device such as a plasma display panel (hereinafter referred to as PDP) or a CRT (cathode ray tube) apparatus, with a purpose of shielding e.g. electromagnetic waves generated from the image display device. Particularly, along with application of PDPs to home televisions, a higher degree of electromagnetic wave shielding property has been required, and accordingly a mesh comprising an electrically conductive material (hereinafter referred to as an electrically conductive mesh) has been employed. However, the surface of an electrically conductive mesh has fine irregularities, and light is scattered and transparency is impaired due to the fine irregularities.

JP-A-2001-77587 discloses that an adhesive film comprising a hot melt resin and an electrically conductive mesh are overlayed on a glass sheet, followed by hot pressing to secure transparency. However, this method has the following problems. Namely, the glass sheet may be broken at the time of hot pressing, or bubbles and foreign substances remain, whereby transparency cannot sufficiently be secured, thus leading to poor appearance. Further, in this method, each treatment has to be carried out individually, and this method is not necessarily satisfactory for mass production of filters for an image display device at a low cost.

The present invention has been made to overcome the above problems of prior arts, and it is an object of the present invention to provide an electromagnetic wave shielding filter which shields electromagnetic waves, and which has excellent transparency and outer appearance, and an efficient process for its production.

The present invention provides a process for producing an electromagnetic wave shielding filter, which comprises bonding a substrate (A) having an electrically conductive mesh layer (a) formed on one side and a functional film layer (c) at the mesh layer (a) side by means of an adhesive layer (b), wherein the laminate disposed in the order of (a)/(b)/(c) is subjected to a fluid pressure treatment, and an electromagnetic wave shielding filter obtained by the production process. The present invention further provides an image display device comprising the electromagnetic wave shielding filter.

Figure 1:
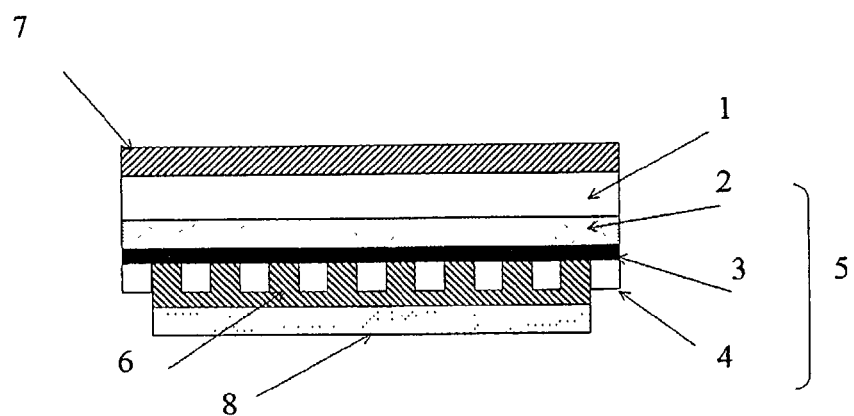
FIG. 1 is a sectional view illustrating one example of a filter for an image display device of the present invention.

Numeral reference 1 designates a tempered glass substrate, numerical reference 2 designates a PET film, numerical reference 3 designates an adhesive, numerical reference 4 designates an electrically conductive mesh layer, numerical reference 5 designates a mesh film, numerical reference 6 designates an adhesive layer, numerical reference 7 designates an antireflection film (having a near infrared ray absorption property also in FIG. 2), and numerical reference 8 designates a near infrared ray absorption film.

Now, the present invention will be described in detail with reference to the preferred embodiments.

The present invention is characterized in that the above laminate is subjected to a fluid pressure treatment. By this treatment, irregularities on the electrically conductive mesh (a) are filled with an adhesive of the adhesive layer (b), whereby scattering of light is suppressed. As a result, transparency of the laminate improves, and an electromagnetic wave shielding filter having favorable transparency can be obtained. The fluid pressure treatment is carried out preferably in a pressure container. The pressure container may be any container in which the laminate can be put, and which can be pressurized with a fluid such as inert gas of e.g. nitrogen, compressed air or inert liquid. Particularly preferred is a pressure method by means of nitrogen or air by e.g. a compressor. In such a fluid pressure treatment, a large amount of the laminate can be treated all at once. Further, pressure is uniformly applied to the laminate, whereby internal strain is less likely to take place, whereby e.g. warpage after the treatment can be prevented, and at the same time, the amount of remaining bubbles and foreign substances can be made extremely small.

The fluid pressure treatment is carried out under a pressure of preferably from 0.3 to 1.0 MPa in order that the irregularities on the electrically conductive mesh layer (a) can sufficiently be filled with the adhesive. Further, the treatment time is preferably from 30 to 120 minutes. The temperature is not particularly limited so long as the adhesive has an appropriate fluidity, but is preferably within a range of from 10 to 100° C. The temperature range is particularly preferably from 30 to 90° C. Taking performances of the electromagnetic wave shielding filter to be obtained and production efficiency into consideration, as particularly preferred treatment conditions, the temperature is from 40 to 70° C., the pressure is from 0.4 to 0.7 MPa and the treatment time is from 30 to 90 minutes.

Further, it is preferred to subject the laminate of the present invention to a depressurization treatment before the fluid pressure treatment, in order that fine bubbles clinging to the electrically conductive mesh can completely be removed. The depressurization treatment is carried out preferably by a method of directly depressurizing the laminate before the fluid pressure treatment, or a method wherein a container for depressurization such as a bag for depressurization is separately prepared, the laminate is preliminarily subjected to the depressurization treatment therein, and then the fluid pressure treatment is separately carried out. The pressure is preferably from −0.05 MPa to −0.1 MPa. The bag for depressurization may be any one in which the laminate can be put and which can be depressurized, but preferred is a bag comprising a plastic film in view of workability.

The electrically conductive mesh layer (a) in the present invention may be a mesh formed from an electrically conductive material comprising a metal such as copper, stainless steel, aluminum, nickel, tin or tungsten, such a metal-made mesh having its surface plated with e.g. nickel or chromium, or a woven fabric made of synthetic fibers having its surface plated with a metal such as copper or nickel. Particularly preferred is a metal-made mesh comprising copper or aluminum.

As a material of the substrate (A) in the present invention, any material may be employed so long as it is a material having favorable visible light transmittance. Specifically, glass or a transparent polymer material such as a polycarbonate type resin, a polyacrylate type resin or a polyester type resin may be mentioned. A transparent polymer material is preferred in view of handling efficiency, and a film made of a polyester type resin is particularly preferred. Most preferred is a film made of polyethylene terephthalate (hereinafter referred to as PET) in view of favorable physical properties and availability.

The electrically conductive mesh layer (a) in the present invention has an electromagnetic wave shielding effect to efficiently absorb electromagnetic waves. As a method for forming the electrically conductive mesh layer (a) of the present invention, any known method may be employed. It is preferred to employ a method of bonding the substrate (A) and a metal thin film as an electrically conductive material by means of an adhesive, followed by etching to form mesh. Particularly preferred is a formation method by means of chemical etching process with photolithography applied. The thickness of the electrically conductive mesh is preferably from 2 to 20 $\mu$m, particularly preferably from 3 to 10 $\mu$m in view of electromagnetic wave shielding property. As the specification of the mesh, preferred is a lattice form with a pitch of from 200 to 400 $\mu$m and a line width of from 5 to 30 $\mu$m, particularly preferred is a lattice form with a pitch of from 250 to 300 $\mu$m and a line width of from 5 to 10 $\mu$m.

The adhesive layer (b) of the present invention may comprise any known adhesive. For example, it preferably comprises an acryl type, acryl copolymer type, silicone type, rubber type or poly(vinyl ether) type adhesive. Further, in order to increase the transparency improving effect, the refractive index of the adhesive is preferably substantially equal to the refractive index of the substrate (A) in a case where the electrically conductive mesh layer (a) is directly formed on the substrate (A), and in a case where the electrically conductive mesh layer (a) is attached or adhered to the substrate (A) by means of an adhesive, the refractive index of the former adhesive is preferably substantially equal to the refractive index of the latter adhesive.

The adhesive layer (b) in the present invention is provided in contact with the electrically conductive mesh layer (a). It may be directly coated on the electrically conductive mesh layer (a). It is advantageous in view of production process and preferred that the adhesive layer (b) is preliminarily formed on the functional film layer (c).

The functional film layer (c) in the present invention has a function other than the electromagnetic wave shielding property. It is particularly preferably a functional film layer having at least one function selected from functions required for a filter for an image display device, such as near infrared ray absorption property, a color tone correcting property, antireflection property and scratch resistance.

The near infrared ray absorption property is a function to absorb near infrared rays emitted from an image display device. It can prevent peripheral device from harmful influence by the near infrared rays. Any known method may be employed so as to impart the near infrared ray absorption property. For example, a method of forming a thin film of an inorganic compound which absorbs near infrared rays on the surface of the functional film layer (c) by sputtering, or a method of coating a near infrared ray absorbent on the surface of the film or incorporating it in the film, may be selected. Particularly preferred is a method of incorporating a near infrared ray absorbent in the film.

The color tone correcting property is a function of correcting an object color displayed, balance correcting of a displayed color and a transmitted light adjustment. Any known method may be employed to impart the color tone correcting property, and preferred is a method of incorporating a color tone correcting colorant which selectively absorbs visible light having a specific wavelength in the film.

The antireflection property is a function to prevent reflection on the surface of an image display device so that a display is easily be observed, and any known method may be employed. It is preferred to provide an antireflection layer on the viewer's side of an image display device. For example, an antireflection effect can be obtained with a film subjected to an antiglare treatment or a film having a low refractive index layer. As the low refractive index layer, a known material having a low refractive index may be employed, and the low refractive index layer preferably comprises an amorphous fluorine-containing polymer in view of an antireflection effect and easiness in layer formation.

Further, the antireflection layer may have a single layer structure comprising a low refractive index material, or may have a multilayer structure comprising a high refractive index material and a low refractive index material. The low refractive index layer may be formed on a film subjected to an antiglare treatment, with a purpose of further improving the antireflection property.

The scratch resistance is a function to prevent the surface from being scratched. Any known method may be employed. Particularly preferably, a film provided with a hard coat layer or a film having self-healing property is employed.

The above functions may be imparted not only to the functional film layer (c) but also to the substrate (A), or a layer having such functions may be provided separately.

The electromagnetic wave shielding filter of the present invention may further be laminated on another substrate or the like. For example, in a case where the substrate (A) is a film comprising a transparent polymer material, it may be bonded to a glass sheet or a sheet-form substrate comprising a highly rigid transparent polymer material, followed by a fluid pressure treatment. Particularly, a glass sheet is preferably used since it has a small coefficient of thermal expansion and has a high rigidity, whereby warpage is less likely to take place.

The type of glass is not particularly limited, but preferred is a tempered glass by means of an air blast method, since it is less likely to be broken and even if it is broken, its broken pieces are small, such being favorable in view of safety. The thickness of the glass sheet is preferably from 1 to 5 mm, and it is particularly preferably at most 3 mm in view of weight saving and at least 2 mm in view of strength.

Particularly preferred is a constitution wherein the substrate (A) comprises a transparent polymer material film, and the substrate (A) is laminated so that its film side is bonded to a tempered glass sheet. According to the fluid pressure treatment of the present invention, such an advantage is achieved that even when the sheet-form substrate is a glass sheet, it is less likely to be broken at the time of pressure treatment.

The electromagnetic wave shielding filter (including a glass substrate electromagnetic wave shielding filter) of the present invention has favorable transparency and thereby is very useful as a filter for an image display device. When the electromagnetic wave shielding filter of the present invention is used as a filter for an image display device, the electromagnetic wave shielding filter is installed on the viewer's side of an image display device, and it may be installed by any method. For example, the electromagnetic wave shielding filter may be installed with a distance from the image display device, or it may be directly bonded to the image display device by means of an adhesive. Further, another function required for a filter for an image display device, such as anti-smudge property on an outermost surface, may easily be imparted.

The image display device may, for example, be CRT or a flat display panel. Particularly, a flat display panel is preferred. The flat display panel may, for example, be PDP, a plasma address liquid crystal display panel (PALC) or a field emission display (FED). The present invention is particularly preferably applied to a filter for PDP, whereby properties of the electromagnetic wave shielding filter of the present invention will adequately be obtained.

Now, the present invention will be explained in further detail with reference to Examples. However, it should be understood that the present invention is by no means restricted to such specific Examples.

PREPARATION EXAMPLE 1

A copper foil having a thickness of 10 $\mu$m was bonded on a film made of polyethylene terephthalate having a thickness of 100 $\mu$m ("COSMOSHINE A4100", trade name, manufactured by Toyobo Co., Ltd.) by means of an acryl type adhesive ("Pyralux LF-0200", trade name, manufactured by DuPont Japan). Then, chemical etching with photolithography was applied to the copper foil of the film to form mesh comprising copper, and a film having an electrically conductive mesh layer formed thereon (hereinafter referred to as a mesh film) was obtained. The mesh was in a lattice form having a pitch of 300 $\mu$m and a line width of 12 $\mu$m with a bias angle of 39 degrees.

EXAMPLE 1

On one side of a soda lime glass substrate having a thickness of 2.5 mm and a size of 980×580 mm, a colored ceramic ink (manufactured by Okuno Chemical Industries Co., Ltd.) was printed by screen printing at a band portion with a width of 10 mm from the entire edge. Then, this glass substrate was heated to 660° C., and immediately after the temperature reached 660° C., the substrate was forcibly cooled with air to obtain a tempered glass substrate. On a side of the tempered glass substrate on which the colored ceramic ink was printed, an adhesive sheet ("LS403A", trade name, manufactured by Lintec Corporation) was bonded, and an antireflection film ("ARCTOP UR2179NF", trade name, manufactured by Asahi Glass Company, Limited) was bonded on the opposite side, by using a roll laminating machine. Then, using a sheet laminating machine, the side of the mesh film prepared in Preparation Example 1 opposite from the electrically conducted mesh layer side, was bonded to the adhesive sheet surface.

Then, using a sheet laminating machine, of a near infrared ray absorption film ("NIR109", trade name, manufactured by Lintec Corporation) provided with an adhesive layer, cut into a size of 960×560 mm, the adhesive layer side was bonded to the electrically conductive mesh layer surface with a periphery of 10 mm remaining. Thus, a laminate having a constitution as shown in FIG. 1 was obtained. This laminate was opaque and contained a large amount of bubbles. The laminate had a haze value of 20% and was poor in transparency.

Then, ten of these laminates were installed in a cylindrical pressure container made of steel (diameter: 1.8 m, length: 2.5 m) so that they were not in contact with one another. A fluid pressure treatment was carried out at 60° C. for 60 minutes by pressurization with compressed air to a gage pressure of 0.5 MPa. Thus, an electromagnetic wave shielding filter having favorable transparency was obtained. This electromagnetic wave shielding filter was transparent, bubbles present before the treatment substantially disappeared, and the filter had a luminous transmittance of 55%, a luminous reflectance of 2.5% and a haze value of 4.1%, and had properties sufficiently suitable for practical use as a filter for an image display device.

EXAMPLE 2

Figure 2:
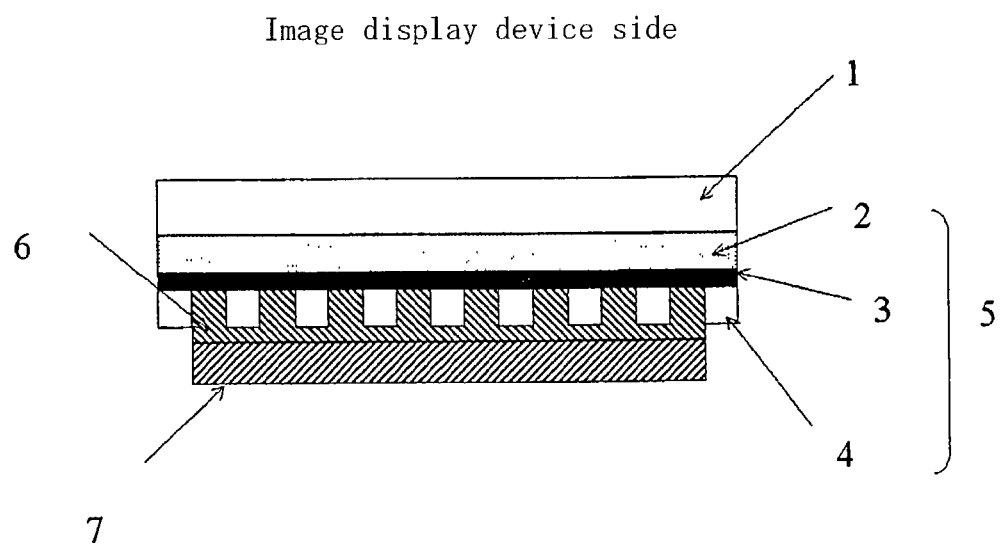
FIG. 2 is a sectional view illustrating another example of a filter for an image display device of the present invention.

A tempered glass substrate was obtained in the same process as in Example 1. An adhesive sheet ("LS403A", trade name, manufactured by Lintec Corporation) was bonded to a side of the tempered glass substrate on which the colored ceramic ink was printed, by using a roll laminating machine. Then, using a sheet laminating machine, a side of the mesh film prepared in Preparation Example 1 opposite from the electrically conductive mesh layer side was bonded to the adhesive sheet surface. Then, using a sheet laminating machine, an adhesive layer side of an antireflection film having a near infrared ray absorption property provided with an adhesive layer ("ARCTOP URP2179", trade name, manufactured by Asahi Glass Company, Limited) was bonded to the electrically conductive mesh layer surface with a periphery of 10 mm remaining. Thus, a laminate having a constitution as shown in FIG. 2 was obtained. The laminate was opaque and contained a large amount of bubbles. Further, the laminate had a haze value of 18% and was poor in transparency.

Then, this laminate was subjected to a fluid pressure treatment in the same method as in Example 1, to obtain an electromagnetic wave shielding filter having favorable transparency. Bubbles present before the treatment substantially disappeared, and the filter had a luminous transmittance of 58%, a luminous reflectance of 3.0% and a haze value of 3.8%, and had properties sufficiently suitable for practical use as a filter for an image display device.

EXAMPLE 3

The same operation as in Example 1 was carried out except that the laminate before the fluid pressure treatment was put in a bag for depressurization comprising a PET film immediately before the fluid pressure treatment, and the laminate was held under a reduced pressure of −0.08 MPa for 5 minutes to obtain an electromagnetic wave shielding filter. In the electromagnetic wave shielding filter, no remaining bubbles were observed at all, and the filter had more excellent transparency with a high luminous transmittance and a low haze value, as compared with the electromagnetic wave shielding filter obtained in Example 1.

EXAMPLE 4

The electromagnetic wave shielding filter obtained in Example 1 was set in a plasma display (TDS4221J-S) manufactured by FUJITSU GENERAL LIMITED by replacing a filter of the display with the electromagnetic wave shielding filter, and usefulness was evaluated by means of outer appearance and optical measurement. The outer appearance was examined in such a manner that a personal computer was connected to an RGB input of a PDP device, and the PDP device was made to emit RGB, black and white light to examine the displayed color, moire, etc. As a result, no particular abnormality in each color and no moire in the specified field of view (120° in the front) were confirmed. On the other hand, the optical measurement was carried out by making the PDP device emit white light, and optical measurement was carried out by using CS-1000 manufactured by Minolta Co., Ltd. with or without the filter. As a result, results as designed, with a filter transmittance of 56.0% and x of 0.305 and y of 0.329 with respect to color tone, were obtained, and its usefulness was confirmed.

According to the present invention, a filter having an excellent electromagnetic wave shielding property and being optically excellent also, can easily be produced. The electromagnetic wave shielding filter thus obtained is very useful as a filter for an image display device.

The entire disclosure of Japanese Patent Application No. 2001-365816 filed on Nov. 30, 2001 including specification, claims, drawings and summary is incorporated herein by reference in its entirety.

What is claimed is:

1. A process for producing an electromagnetic wave shielding filter, comprising steps of:
    bonding a substrate having an electrically conductive mesh layer on one side and a functional film layer at the mesh layer side with an adhesive layer; and
    applying a fluid pressure treatment to a laminate that includes the substrate, the mesh layer, the adhesive layer, and the functional film layer, such that a pressure of the fluid pressure treatment is between three and ten times atmospheric pressure.

2. The production process according to claim 1, wherein the adhesive layer is preliminarily formed on the functional film layer.

3. The production process according to claim 1, wherein a depressurization treatment is carried out before the fluid pressure treatment, and then the fluid pressure treatment is carried out.

4. The production process according to claim 1, wherein the substrate comprises a transparent polymer film.

5. A process for producing an electromagnetic wave shielding filter comprising a layer of a substrate, and an electrically conductive mesh layer, an adhesive layer and a functional film layer on one side of the layer of the substrate in this order from the substrate side, which comprises steps of:
    bonding the substrate having the electrically conductive mesh layer preliminarily formed on one side of the substrate and the functional film having the adhesive layer preliminarily formed on one side of the functional film; and
    bonding at least the electrically conductive mesh layer and the adhesive layer with a fluid pressure treatment, such that a pressure of the fluid pressure treatment is between three and ten times atmospheric pressure.

6. The production process according to claim 5, wherein a depressurization treatment is carried out before the fluid pressure treatment, and then the fluid pressure treatment is carried out.

7. The production process according to claim 5, wherein the substrate comprises a transparent polymer film.

* * * * *